US007493545B2

(12) United States Patent
Hiraki et al.

(10) Patent No.: US 7,493,545 B2
(45) Date of Patent: *Feb. 17, 2009

(54) RECEPTION SYSTEM THAT INHIBITS TRANSMISSION OF ACKNOWLEDGMENT OR NEGATIVE ACKNOWLEDGMENT SIGNAL FOR A DATA CHANNEL WHEN CONTROL INFORMATION OF A CONTROL CHANNEL EXCEEDS A RECEPTION CAPABILITY OF A RECEIVER (75) Inventors: Toshiaki Hiraki, Nomi-gun (JP); Hidetoshi Suzuki, Kanagawa (JP)

(73) Assignee: Panasonic Corporation, Osaka (JP)

( * ) Notice: Subject to any disclaimer, the term of this patent is extended or adjusted under 35 U.S.C. 154(b) by 51 days.

This patent is subject to a terminal disclaimer.

(21) Appl. No.: 11/677,419

(22) Filed: Feb. 21, 2007

(65) Prior Publication Data

US 2007/0136634 A1   Jun. 14, 2007

Related U.S. Application Data (63) Continuation of application No. 10/510,350, filed as application No. PCT/JP03/09625 on Jul. 30, 2003, now Pat. No. 7,200,788.

(30) Foreign Application Priority Data

Feb. 12, 2003   (JP)   ............... 2003-034201

(51) Int. Cl.
G08C 25/02   (2006.01)
G01R 31/28   (2006.01)
H04B 1/00   (2006.01)
H04B 1/16   (2006.01)

(52) U.S. Cl. .................. 714/748; 714/712; 455/68; 455/334

(58) Field of Classification Search ................. 714/712, 714/748; 455/68, 334
See application file for complete search history.

(56) References Cited

U.S. PATENT DOCUMENTS 5,577,087 A   11/1996   Furuya (Continued)

FOREIGN PATENT DOCUMENTS

EP   1187386   3/2002

(Continued)

OTHER PUBLICATIONS

European Search Report dated Apr. 25, 2006.

(Continued)

*Primary Examiner*—Cynthia Britt
(74) *Attorney, Agent, or Firm*—Dickinson Wright, PLLC (57) ABSTRACT When a determination section of a reception apparatus determines that a control channel is intended for the reception apparatus, a comparing section of the reception apparatus compares control information transmitted on the control channel with a reception capability of the reception apparatus. A data channel reception section of the reception apparatus receives a data channel when the control information is within the reception capability of the reception apparatus, but does not receive the data channel when the control information exceeds the reception capability of the reception apparatus. When the control information exceeds the reception capability of the reception apparatus, the transmission section does not transmit an ACK signal and a NACK signal with respect to the data channel.

13 Claims, 4 Drawing Sheets

U.S. PATENT DOCUMENTS

| | | |
|---|---|---|
| 6,351,638 B1 | 2/2002 | Robinson |
| 6,799,196 B1 | 9/2004 | Smith |
| 2002/0046379 A1 | 4/2002 | Miki et al. |
| 2002/0132641 A1 | 9/2002 | Erhage et al. |
| 2002/0155829 A1 | 10/2002 | Proctor, Jr. et al. |
| 2002/0172192 A1 | 11/2002 | Hunzinger et al. |
| 2003/0165120 A1 | 9/2003 | Uesugi et al. |
| 2006/0019610 A1 | 1/2006 | Ue et al. |

FOREIGN PATENT DOCUMENTS

| | | | |
|---|---|---|---|
| EP | 1278327 A | 1/2003 | |
| JP | 02174321 | 7/1990 | |
| JP | 5130082 A | 5/1993 | |
| JP | 11177538 | 7/1999 | |
| JP | 200069110 A | 3/2000 | |
| JP | 2000244463 | 9/2000 | |
| JP | 2002135233 | 5/2002 | |
| JP | 2002281003 | 9/2002 | |

OTHER PUBLICATIONS

M. Mouly, et al.: "Signalling Transfer", GSM System for Mobile Communications, Lessay-Les-Chateaux, Europe Media, FR, 1993, pp. 260-306, XP000860005.

3GPP TSG-RAN WG1 #34, "UE specific CRC for HSDPA," Sophia Antipolis, France, Feb. 17-21, 2003, Tdoc R2-030126, pp. 1 and 2.

3GPP TSG-RAN WG1 #31, "LS on Delivery of Wrong Data to Upper Layers for HSDPA," Tokyo, Japan, Feb. 18-21, 2003, R1-030336, pp. 1 and 2.

Russian Office Action dated Oct. 25, 2005 with English translation.

| CONTROL CHANNEL 1 | CONTROL INFORMATION 1 |
| CONTROL CHANNEL 2 | CONTROL INFORMATION 2 |
| ⋮ | ⋮ |
| CONTROL CHANNEL N | CONTROL INFORMATION N |

RECEPTION SYSTEM THAT INHIBITS TRANSMISSION OF ACKNOWLEDGMENT OR NEGATIVE ACKNOWLEDGMENT SIGNAL FOR A DATA CHANNEL WHEN CONTROL INFORMATION OF A CONTROL CHANNEL EXCEEDS A RECEPTION CAPABILITY OF A RECEIVER

This is a continuation application of application Ser. No. 10/510,350, filed Apr. 6, 2005, the priority of which is claimed under 35 USC §120.

TECHNICAL FIELD

The present invention relates to a reception apparatus and reception method using control information transmitted on a control channel in decoding information data transmitted on a data channel.

BACKGROUND ART

Figure 1:
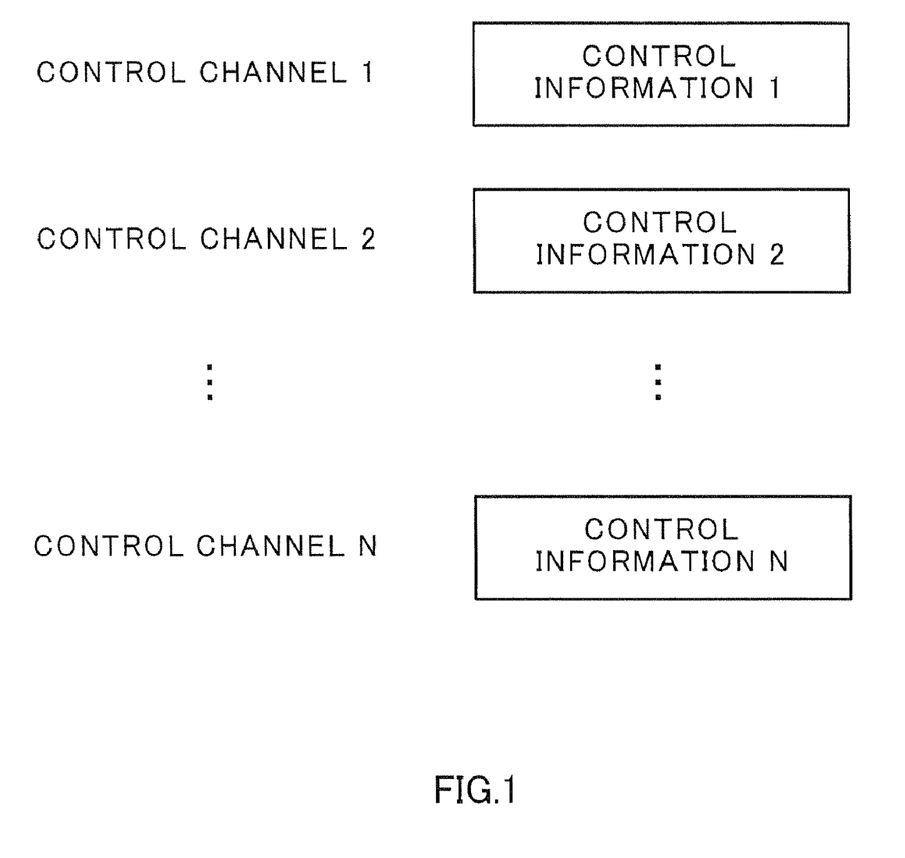
FIG. 1 is a chart to explain a structure of a control channel.

FIG. 1 is a diagram illustrating control channels transmitted from a transmission apparatus. In the figure, the control channels are used in transmitting information necessary for performing reception, demodulation and decoding on a data channel i.e. control information including the number of multicodes, modulation scheme, the number of information bits, and so on. When there are a plurality of reception apparatuses, information indicating which reception apparatus the channel is for is coded and transmitted on each control channel, so that each reception apparatus is able to detect the control channel for the reception apparatus from among multiple received control channels.

Figure 2:
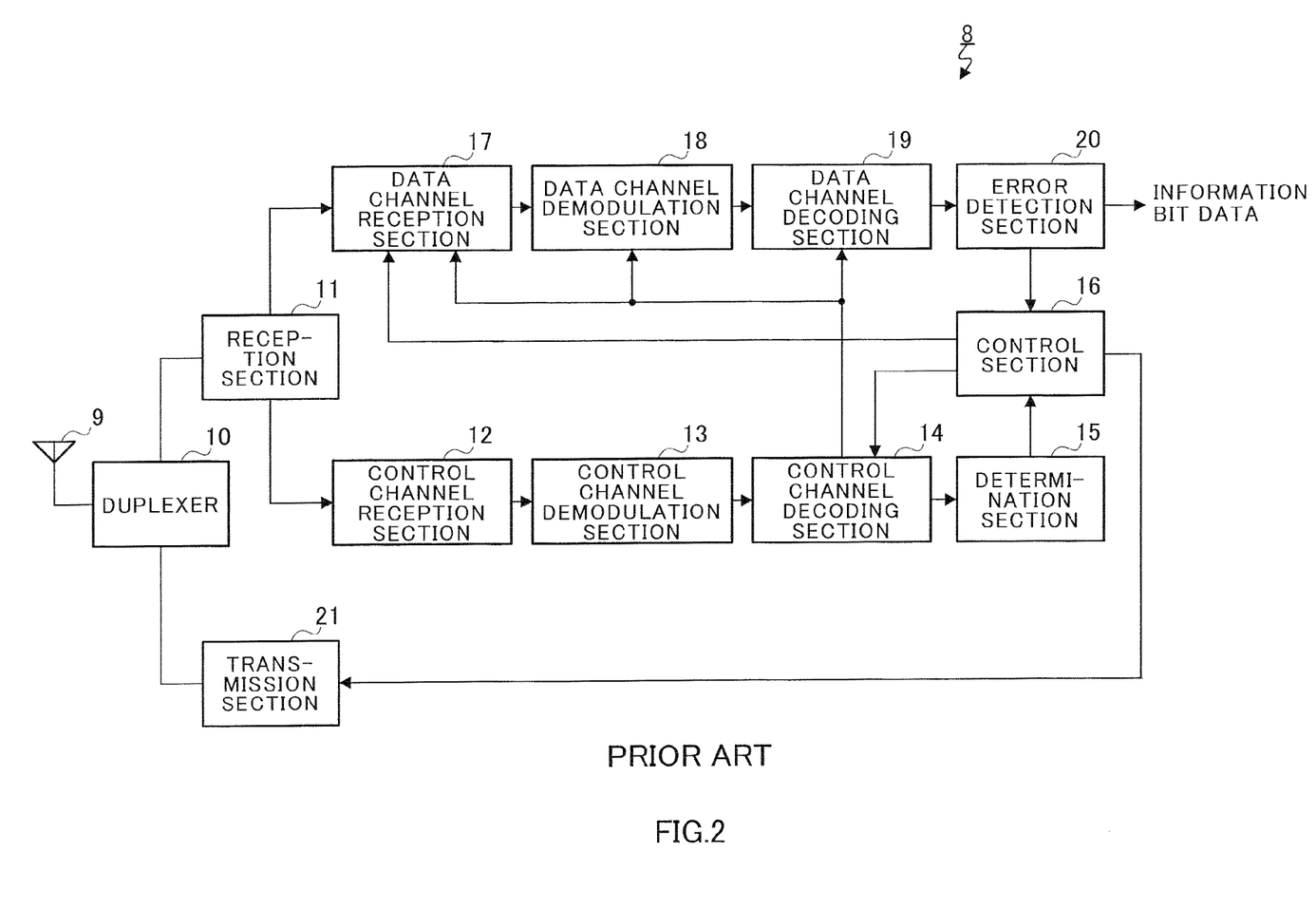
FIG. 2 is a block diagram illustrating a configuration of a conventional reception apparatus.

FIG. 2 is a block diagram illustrating a configuration of a conventional reception apparatus. Reception apparatus 8 as shown in the figure is provided with antenna 9, duplexer 10, reception section 11, control channel reception section 12, control channel demodulation section 13, control channel decoding section 14, determination section 15, control section 16, data channel reception section 17, data channel demodulation section 18, data channel decoding section 19, error detection section 20 and transmission section 21. In such a configuration, signals of a plurality of (or a single) control channels are received in antenna 9, output to duplexer 10 and reception section 11 sequentially, and received in control channel reception section 12. The received signals of the plurality of control channels are input to control channel demodulation section 13, and subjected to demodulation for each channel. Each demodulation result is input to control channel decoding section 14. Control channel decoding section 14 performs decoding on the demodulation result of each of the plurality of control channels input from control channel demodulation section 13, and inputs the decoding results to determination section 15.

Based on each of the decoding results input from control channel decoding section 14, determination section 15 determines whether there is a channel intended for reception apparatus 8 among the received plurality of control channels. The determination is made, for example, using an error check bit and/or likelihood information calculated in control channel decoding section 14. When a control channel for reception apparatus 8 is present as a result of the determination, determination section 15 notifies control section 16 of the presence. Upon receiving the notification, control section 16 controls data channel reception section 17, data channel demodulation section 18, and data channel decoding section 19 to perform reception, demodulation and decoding on a data channel using control information indicated by the decoding result of the control channel for reception apparatus 8.

Meanwhile, error detection section 20 detects an error of decoded data input from data channel decoding section 19, and notifies control section 16 of the result. In the case of receiving the notification indicating that no error is detected from error detection section 20, control section 16 outputs an ACK (ACknowledgment) signal to transmit from transmission section 21. In the case of receiving the notification indicating that an error is detected from error detection section 20, control section 16 outputs a NACK (Negative ACknowledgment) signal to transmit from transmission section 21. Further, in the case where a control channel for reception apparatus 8 is not detected from a determination result in determination section 15, control section 16 does not perform reception of data channel.

In addition, a method is proposed that reception processing on a data channel is controlled using an error detecting code of control information added to the data channel in receiving the data channel (for example, Japanese Laid-Open Patent Publication 2000-244463).

However, conventional reception apparatus 8 as described above has such a problem that when the control channel determination misidentifies a control channel not for reception apparatus 8 as a control channel for reception apparatus 8, reception, demodulation and decoding on a data channel is carried out using wrong control information.

Further, when data channel signals are properly decoded accidentally using wrong control information, data to a reception apparatus except reception apparatus 8 is received, and there arise problems with inconsistency of data and confidentiality.

Furthermore, in a communication system using so-called hybrid ARQ (Automatic Repeat reQuest), when reception, demodulation and decoding on a data channel is once carried out using wrong control information, it is not possible to decode data accurately in error correction using subsequent retransmitted data, and gains in hybrid ARQ may be lost as a result.

DISCLOSURE OF INVENTION

It is an object of the present invention to provide a reception apparatus and reception method capable of preventing execution of reception, demodulation and decoding on a data channel using wrong control information.

In order to achieve the object, in the present invention, whether or not a received control channel is intended for a reception apparatus having received the channel is determined using an error checkbit, likelihood information calculated in decoding the control channel, or the like. Then, when it is determined that the control channel is intended for the reception apparatus, the apparatus compares control information (the number of multicodes, modulation scheme, the number of information bits and so on necessary for reception of a data channel) transmitted on the control channel with the reception capability (the number of multicodes, modulation scheme, the number of information bits and so on available in the reception apparatus) of the reception apparatus, and does not receive the data channel unless the control information is within a scope of the reception capability of the reception apparatus. Meanwhile, when the control information is within the scope of the reception capability, the data channel is received.

BEST MODE FOR CARRYING OUT THE INVENTION

An embodiment of the present invention will be specifically described below with reference to accompanying drawings.

Figure 3:
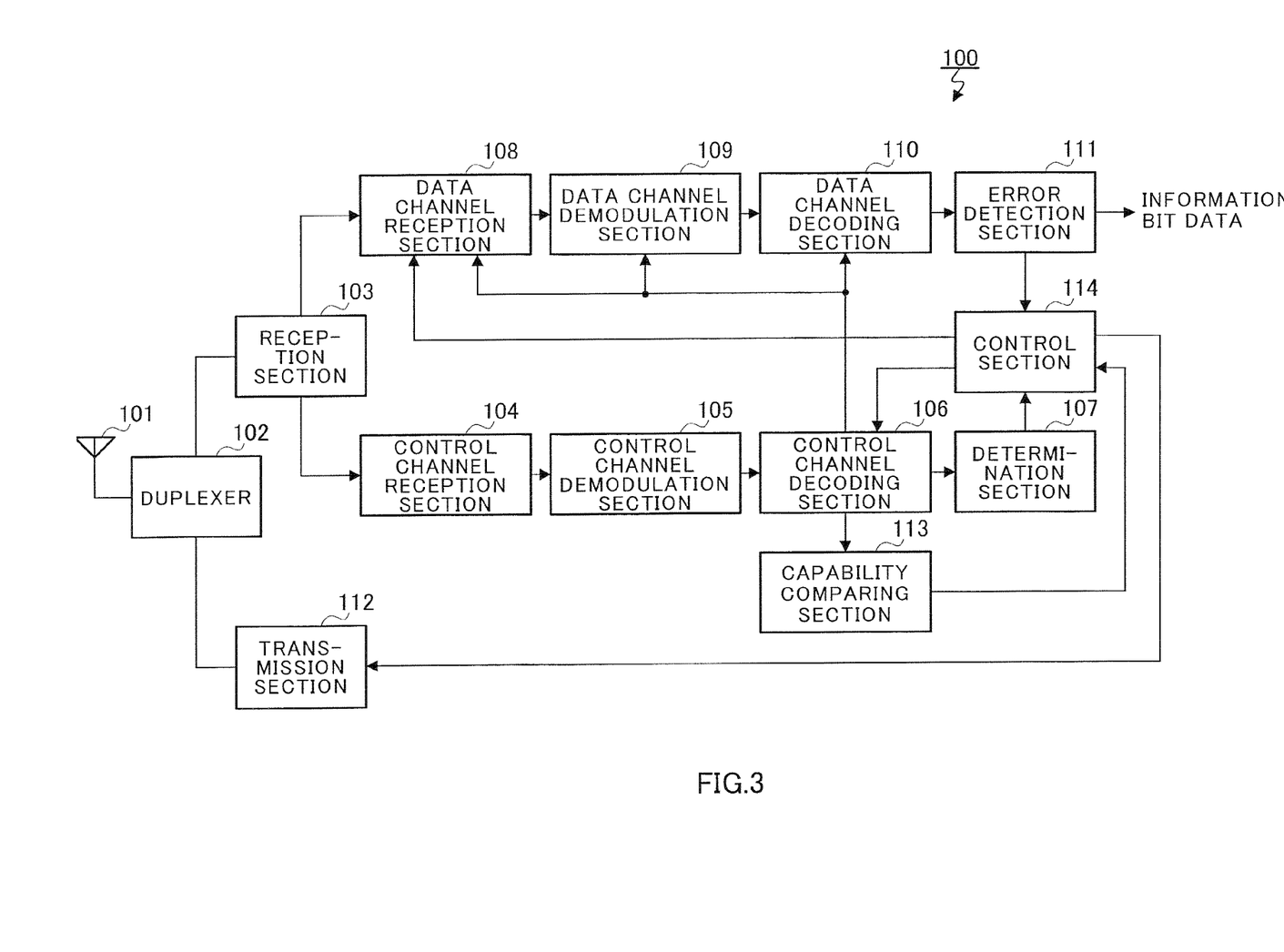
FIG. 3 is a block diagram illustrating a configuration of a reception apparatus according to one embodiment of the present invention.

FIG. 3 is a block diagram illustrating a configuration of a reception apparatus according to one embodiment of the present invention. In FIG. 3, reception apparatus 100 according to this embodiment has capability comparing section 113. When determination section 107 determines there is a control channel intended for reception apparatus 100, the section 113 compares control information transmitted on the control channel with the reception capability of reception apparatus 100 to check reliability of the determination about the control channel that is determined to be for reception apparatus 100. Reception apparatus 100 further has control section 114. The section 114 does not receive a data channel nor perform transmission of an ACK signal and NACK signal unless the control information is within a scope of the reception capability of reception apparatus 100 in the comparison in capability comparing section 113, while receiving a data channel and transmitting an ACK signal or NACK signal when the control information is within the scope of the reception capability of reception apparatus 100.

Control channel reception section 104 receives signals of a plurality of (or a single) control channels from radio signals received in reception section 103 via duplexer 102, and inputs each of the received plurality of control channels to control channel demodulation section 105. Control channel demodulation section 105 performs demodulation on each of the plurality of control channels input from control channel reception section 104, and inputs each demodulation result to control channel decoding section 106. Control channel decoding section 106 performs decoding on respective demodulation results of the plurality of control channels input from control channel demodulation section 105, and inputs each decoding result to determination section 107.

Determination section 107 determines whether there is a control channel intended for reception apparatus 100 among the received plurality of control channels from respective decoding results of the plurality of control channels, and notifies the determination result to control section 114. When determination section 107 determines that a control channel intended for reception apparatus 100 exists and notifies the determination result to control section 114, control section 114 instructs control channel decoding section 106 to output control information that is a decoding result of the control channel for reception apparatus 100 to capability comparing section 113. Capability comparing section 113 compares the control information input from control channel decoding section 106 with the reception capability of reception apparatus 100, and notifies the comparison result to control section 114. Corresponding to outputs from determination section 107 and capability comparing section 113, control section 114 controls control channel decoding section 106 and data channel reception section 108.

According to the instruction from control section 114, data channel reception section 108 receives a data channel using the control information obtained by decoding the control channel. Data channel demodulation section 109 performs demodulation on the data channel using the control information obtained by decoding the control channel. Data channel decoding section 110 performs decoding on the data channel using the control information obtained by decoding the control channel, and outputs decoded data. Error detection section 111 detects an error of the decoded data input from data channel decoding section 110, and notifies the result to control section 114. When receiving a notification indicative of no error being detected from error detection section 111, control section 114 outputs an ACK signal to transmission section 112. Meanwhile, when receiving a notification indicative of an error being detected from error detection section 111, control section 114 outputs a NACK signal to transmission section 112. In addition, control section 114 controls whether or not to transmit the ACK signal or NACK signal according to the comparison result in capability comparing section 113. Transmission section 112 transmits the ACK signal and NACK signal output from control section 114.

The operation of reception apparatus 100 according to this embodiment will be described below. First, a plurality of control channels transmitted from a transmission apparatus is received in control channel reception section 104. The received plurality of control channels are demodulated in control channel demodulation section 105, and decoded in control channel decoding section 106. Then, decoding results of the plurality of control channels are input to determination section 107.

At this point, when the transmission apparatus transmits a control channel addressed to reception apparatus 100, it is required to detect the channel for reception apparatus 100 among the received plurality of control channels. When the transmission apparatus does not transmit a control channel addressed to reception apparatus 100, it is required not to detect a wrong control channel.

Therefore, when an error check bit is added to a control channel, determination section 107 determines whether each of the plurality of control channels is a control channel intended for reception apparatus 100 using the error check bit. In contrast thereto, when an error check bit is not added to a control channel, determination section 107 determines whether each of the plurality of control channels is a control channel intended for reception apparatus 100, using output likelihood of a Viterbi decoder, turbo decoder or the like used in decoding in control channel decoding section 106. Then, determination section 107 inputs the determination result to control section 114.

When recognizing that there is no control channel intended for reception apparatus 100 from the determination result, control section 114 instructs data channel reception section 108 to discard a data channel without performing reception on the data channel. In contrast thereto, when recognizing that there is a control channel intended for reception apparatus 100 from the determination result, reception apparatus 100 compares control information (the number of multicodes, modulation scheme and the number of information bits necessary for reception of the data channel) transmitted on the control channel determined to be for reception apparatus 100 with the reception capability (the number of multicodes, modulation scheme and the number of information bits available in reception apparatus 100) of reception apparatus 100. In other words, control section 114 instructs capability comparing section 113 to compare the control information that is the decoding result of the control channel determined to be for reception apparatus 100 with the reception capability of reception apparatus 100.

When it is recognized from the comparison result output from capability comparing section 113 that the control information transmitted on the control channel determined to be for reception apparatus 100 is within a scope of the reception capability of reception apparatus 100, control section 114 instructs data channel reception section 108 to receive the data channel. Meanwhile, when the control information transmitted on the control channel determined to be for reception apparatus 100 is out of the scope of the reception capability of reception apparatus 100, control section 114 instructs data channel reception section 108 not to receive the data channel.

For example, it is assumed herein that the reception capability of reception apparatus 100 is of five codes as the number of multicodes, and that the control information transmitted on the control channel determined to be for reception apparatus 100 indicates five codes as the number of multicodes. In this case, the number of multicodes indicated in the control information is not more than the number of multicodes that reception apparatus 100 is capable of receiving, the control information is thus within a scope of the reception capability of reception apparatus 100, and therefore, control section 114 instructs data channel reception section 108 to receive the data channel.

It is further assumed that the control information transmitted on the control channel determined to be for reception apparatus 100 indicates ten codes as the number of multicodes. In this case, the number of multicodes indicated in the control information exceeds the number of multicodes that reception apparatus 100 is capable of receiving, and the control information is thus out of the scope of the reception capability of reception apparatus 100. Therefore, control section 114 determines that the control channel was erroneously determined to be for reception apparatus 100 in determination section 107, and instructs data channel reception section 108 not to receive this data channel. At this point, there is a possibility that another reception apparatus transmits a signal to the transmission apparatus at the timing at which reception apparatus 100 transmits an ACK signal or NACK signal, and therefore, reception apparatus 100 does not transmit the ACK signal or NACK signal. In other words, when the control information is out of a scope of the reception capability of reception apparatus 100, control section 114 instructs transmission section 112 not to transmit the ACK signal or NACK signal. According to this instruction, when the control information is out of a scope of the reception capability of reception apparatus 100, transmission section 112 does not transmit the ACK signal or NACK signal. By this means, it is possible to suppress interference provided to signals transmitted from another reception apparatus.

A case will be descried below where reception apparatus 100 according to this embodiment is applied to an HSDPA (High Speed Downlink Packet Access) system based on specifications of 3GPP (3rd Generation Partnership Project) that is a standardization project in mobile communications.

Figure 4:
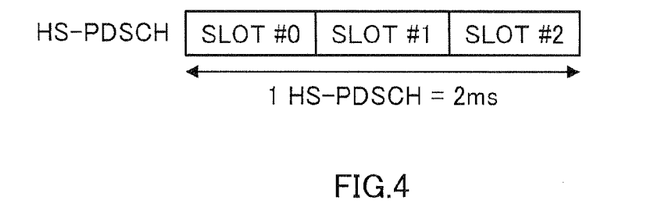
FIG. 4 is a chart illustrating a frame structure of HS-PDSCH used in an HSDPA system.
Figure 5:
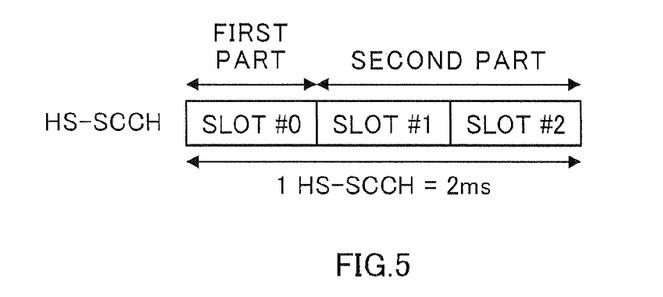
FIG. 5 is a chart illustrating a frame structure of HS-SCCH used in the HSDPA system.

FIG. 4 is a chart illustrating a frame structure of HS-PDSCH (High Speed-Physical Downlink Shared Channel) used in the HSDPA system. FIG. 5 is a chart illustrating a frame structure of HS-SCCH (High Speed-Shared Control Channel) used in the HSDPA system. As shown in FIG. 4, HS-PDSCH that is a physical channel is comprised of a subframe having three slots (slots #0 to #2), and is a data channel including information bits. Further, as shown in FIG. 5, HS-SCCH that is a physical channel is a control channel comprised of a subframe having total three slots, slot #0 that is a first part, and slots #1 and #2 that are a second part. The first part includes information indicative of a channelization code number, the number of channelization codes, and a modulation scheme used in HS-PDSCH, and the second part includes a transport block size, a hybrid ARQ process number, hybrid ARQ parameter and new data identification bit. The information included in the first and second parts of HS-SCCH is control information required for reception processing of HS-PDSCH. In addition, the subframe length is 2 ms both in HS-PDSCH and HS-SCCH.

Figure 6:
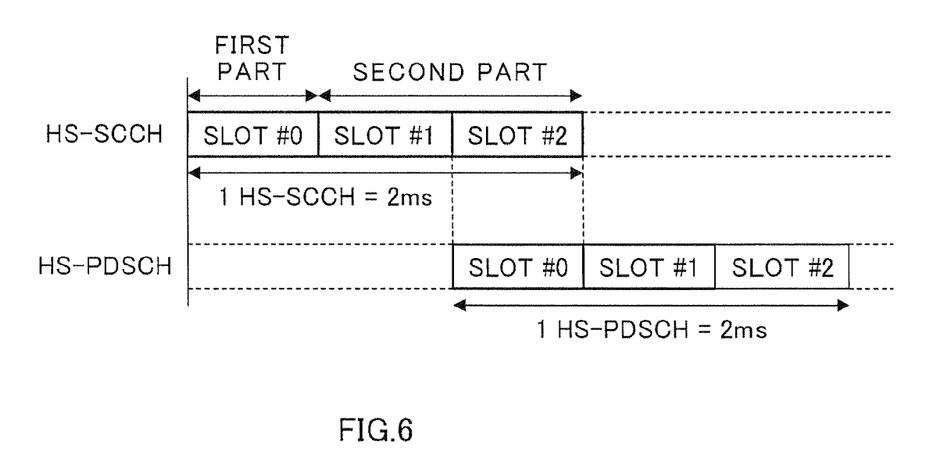
FIG. 6 is a chart illustrating a timing relation between HS-SCCH and HS-PDSCH.

FIG. 6 is a chart illustrating the timing relation between HS-SCCH and HS-PDSCH. The beginning of the subframe of HS-SCCH is positioned two slots earlier than the beginning of the subframe of corresponding HS-PDSCH. Since on HS-SCCH is transmitted coded information indicative of a reception apparatus to which the HS-SCCH is transmitted, reception apparatus 100 as shown in FIG. 3 detects HS-SCCH addressed to reception apparatus 100 from a received plurality of HS-SCCHs. Then, using the control information transmitted on the detected HS-SCCH, reception apparatus 100 performs reception processing on HS-PDSCH. Since the first part and second part are separately coded on HS-SCCH, it is also possible to perform reception processing on HS-PDSCH using a decoding result of the first part before finishing decoding of the second part.

With reference to FIG. 3, the operation will be described below of receiving the first part of HS-SCCH in reception apparatus 100 as shown in FIG. 3. Each of a plurality of HS-SCCHs transmitted from a transmission apparatus is received in control channel reception section 104. Each of the received plurality of HS-SCCHs is demodulated in control channel demodulation section 105, and decoded in control channel decoding section 106. Then, decoding results of the plurality of HS-SCCHs is input to determination section 107.

At this point, when the transmission apparatus transmits HS-SCCH addressed to reception apparatus 100, it is required to detect the HS-SCCH for reception apparatus 100 among the received plurality of HS-SCCHs. When the transmission apparatus does not transmit HS-SCCH addressed to reception apparatus 100, it is required not to detect wrong HS-SCCH.

Since an error check bit is not added to the first part of HS-SCCH, determination section 107 determines whether each of the plurality of HS-SCCHs is a control channel intended for reception apparatus 100, using output likelihood of a Viterbi decoder used in decoding in control channel decoding section 106, and outputs the determination result to control section 114.

When recognizing that there is no HS-SCCH for intended reception apparatus 100 from the determination result, control section 114 instructs data channel reception section 108 to discard HS-PDSCH without performing reception on the HS-PDSCH. In contrast thereto, when recognizing that there is HS-SCCH intended for reception apparatus 100 from the determination result, reception apparatus 100 compares control information transmitted on the HS-SCCH determined to be for reception apparatus 100 with the reception capability of reception apparatus 100. In other words, control section 114 instructs capability comparing section 113 to compare the control information that is the decoding result of the HS-SCCH determined to be for reception apparatus 100 with the reception capability of reception apparatus 100. According to the instruction from control section 114, capability comparing section 113 compares the reception capability of reception apparatus 100 with a channelization code number, the number of channelization codes and a modulation scheme which are used in receiving HS-PDSCH corresponding to the HS-SCCH determined to be for reception apparatus 100 and which are contained in the first part of the HS-SCCH.

When it is recognized from the comparison result output from capability comparing section 113 that the control information transmitted on the HS-SCCH determined to be for reception apparatus 100 is within a scope of the reception capability of reception apparatus 100, control section 114 instructs data channel reception section 108 to receive the HS-PDSCH. Meanwhile, when the control information transmitted on the HS-SCCH determined to be for reception apparatus 100 is out of the scope of the reception capability of reception apparatus 100, control section 114 instructs data channel reception section 108 not to receive the HS-PDSCH.

For example, it is assumed herein that the reception capability of reception apparatus 100 is of ten codes as the number of multicodes of HS-PDSCH, and that the control information transmitted on the HS-SCCH determined to be for reception apparatus 100 indicates five codes as the number of multicodes. In this case, the number of multicodes indicated in the control information is less than the number of multicodes that reception apparatus 100 is capable of receiving, the control information is thus within a scope of the reception capability of reception apparatus 100, and therefore, control section 114 instructs data channel reception section 108 to receive the HS-PDSCH.

It is further assumed that the control information transmitted on the control channel determined to be for reception apparatus 100 indicates fifteen codes as the number of multicodes. In this case, the number of multicodes indicated in the control information exceeds the number of multicodes that reception apparatus 100 is capable of receiving, and the control information is thus out of the scope of the reception capability of reception apparatus 100. Therefore, control section 114 determines that the HS-SCCH was erroneously determined to be for reception apparatus 100 in determination section 107, and instructs data channel reception section 108 not to receive the HS-PDSCH.

It is further assumed that a demodulation scheme on HS-PDSCH as the reception capability of reception apparatus 100 corresponds to only QPSK, and that the control information transmitted on HS-SCCH determined to be for reception apparatus 100 indicates QPSK as a modulation scheme. In this case, since the modulation scheme indicated in the control information agrees with the modulation scheme that reception apparatus 100 is capable of receiving, the control information is within a scope of the reception capability, and therefore, control section 114 instructs data channel reception section 108 to receive the HS-PDSCH.

It is further assumed that the control information transmitted on a control channel determined to be for reception apparatus 100 indicates 16 QAM as a modulation scheme. In this case, the modulation scheme indicated in the control information does not agree with the modulation scheme that reception apparatus 100 is capable of receiving, and the control information is thus out of the scope of the reception capability of reception apparatus 100. Therefore, control section 114 determines that the HS-SCCH was erroneously determined to be for reception apparatus 100 in determination section 107, and instructs data channel reception section 108 not to receive the HS-PDSCH.

In this way, according to the reception apparatus of the present invention, by comparing the reception capability of the reception apparatus with control information transmitted on a control channel addressed to the reception apparatus among a plurality of control channels, it is possible to detect a control channel to the reception apparatus with accuracy and prevent a data channel from being received, demodulated and decoded using wrong control information. Further, since an ACK signal or NACK signal is not transmitted in this case, it is possible to reduce interference on another reception apparatus caused by transmission of the ACK signal or NACK signal.

In addition, in this embodiment, after determination section 107 determines whether or not a received control channel is one intended for the reception apparatus, capability comparing section 113 compares the control information with the reception capability of the reception apparatus. However, determination section 107 may determine whether or not a received control channel is one intended for the reception apparatus, after capability comparing section 113 compares the control information with the reception capability of the reception apparatus.

As described above, according to the present invention, when a control channel addressed to a reception apparatus is detected, control information transmitted on the control channel is compared with the reception capability of the reception apparatus, and it is thereby possible to prevent a data channel from being received, demodulated and decoded using wrong control information. Further, since an ACK signal or NACK signal is not transmitted at this point, it is also possible to reduce interference on another reception apparatus caused by transmission of the ACK signal or NACK signal.

This application is based on the Japanese Patent Application No. 2003-034201 filed on Feb. 12, 2003, entire content of which is expressly incorporated by reference herein.

INDUSTRIAL APPLICABILITY

The present invention is applicable to a radio communication mobile station apparatus used in a mobile communication system.

The invention claimed is:

1. A reception apparatus used in a mobile communication system in which control information on a control channel is transmitted earlier than information on a data channel multiplexed in time and code, said reception apparatus comprising:
 a receiver that receives the control information on the control channel;
 a comparator that compares the control information with a reception capability of the reception apparatus for the data channel; and
 a transmitter that, based on a comparison result in the comparator, transmits an ACK signal or a NACK signal for the data channel when the control information is within said reception capability and transmits neither the ACK signal nor the NACK signal when the control information exceeds said reception capability.

2. The reception apparatus according to claim 1, further comprising a determiner that determines whether or not the control information is a control information intended for the reception apparatus,
 wherein, based on the comparison result in the comparator and a determination result in the determiner, the transmitter transmits the ACK signal or the NACK signal when the control information is within said reception capability and the control information is a control information intended for the reception apparatus.

3. The reception apparatus according to claim 1, wherein the information on the data channel is received using the control information.

4. The reception apparatus according to claim 1, wherein the control channel is HS-SCCH, while the data channel is HS-PDSCH.

5. The reception apparatus according to claim 1, wherein when a number of multicodes required to receive information on the data channel indicated in the control information exceeds a number of multicodes that the reception apparatus is capable of receiving, the transmitter transmits neither the ACK signal nor the NACK signal.

6. The reception apparatus according to claim 1, wherein when a modulation scheme used in transmitting information on the data channel indicated in the control information is a modulation scheme that the reception apparatus is not capable of receiving, the transmitter transmits neither the ACK signal nor the NACK signal.

7. A radio communication mobile station apparatus comprising the reception apparatus according to claim 1.

8. A radio communication method used in a mobile communication system in which control information on a control channel is transmitted earlier than information on a data channel multiplexed in time and code, said method comprising:
(a) determining whether a situation exists in which the control information transmitted on a control channel is a control information intended for the radio mobile station and the control information is within a reception capability of the radio mobile station for a data channel, and
(b) transmitting an ACK signal or a NACK signal for the data channel based on a determination that said situation exists, and transmitting neither the ACK signal nor the NACK signal based on a determination that said situation does not exist.

9. A radio communication method used in a mobile communication system in which control information on a control channel is transmitted earlier than information on a data channel multiplexed in time and code, the method comprising:
(a) receiving the control information on the control channel;
(b) comparing the control information with a reception capability of a radio mobile station for the data channel; and
(c) based on a comparison result in the step (b) transmitting an ACK signal or a NACK signal for the data channel when the control information is within said reception capability and transmitting neither the ACK signal nor the NACK signal when the control information exceeds said reception capability.

10. The radio communication method according to claim 9, wherein the information on the data channel is received using the control information.

11. The radio communication method according to claim 9, wherein the control channel is HS-SCCH, while the data channel is HS-PDSCH.

12. The radio communication method according to claim 9, wherein the step (b) comprises comparing a number of multicodes required to receive information on the data channel indicated in the control information with a number of multicodes that the radio mobile station is capable of receiving.

13. The radio communication method according to claim 9, wherein the step (b) comprises comparing a modulation scheme used in transmitting information on the data channel indicated in the control information with a modulation scheme that the radio mobile station is capable of receiving.

* * * * *